July 30, 1968
C. LISCIANI
3,394,732
VALVE SEAL
Filed April 26, 1965
2 Sheets-Sheet 1
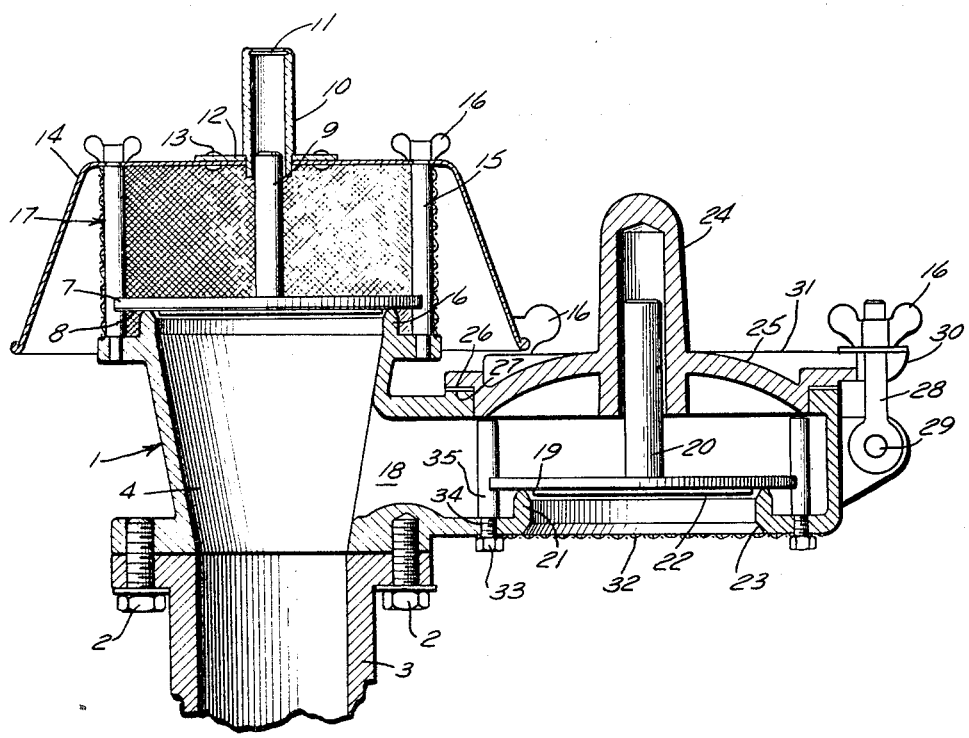
INVENTOR.
CONSTANTINE LISCIANI
BY
*Lee & Lee*
ATTORNEYS

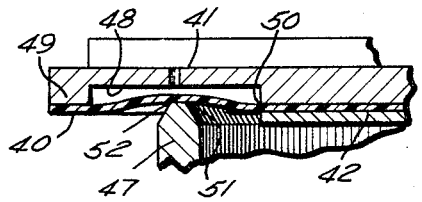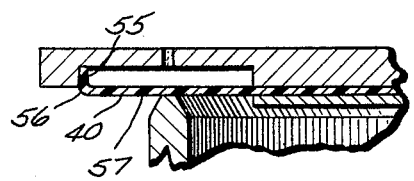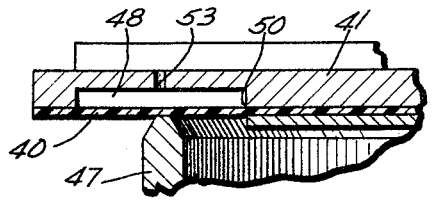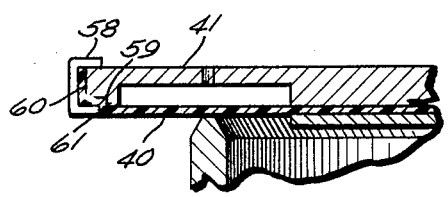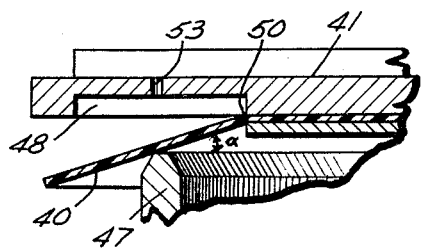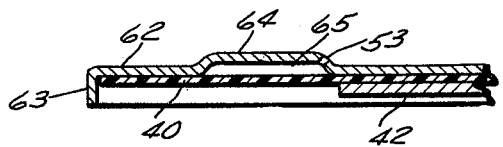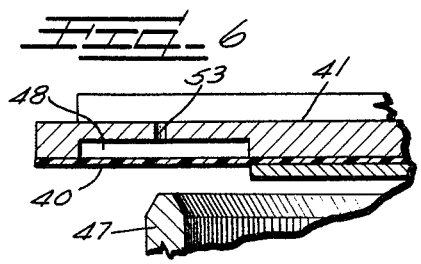

United States Patent Office 3,394,732
Patented July 30, 1968

3,394,732
VALVE SEAL
Constantine Lisciani, Chicago, Ill., assignor to The Protectoseal Company, Chicago, Ill., a corporation of Illinois
Filed Apr. 26, 1965, Ser. No. 450,765
7 Claims. (Cl. 137—533.21)

This invention relates to a valve seal and in particular to a valve seal having improved seating features and increased longevity.

Low pressure and vacuum relief valve assemblies currently utilize either metal to metal valve seating or cantilever type resilient seating such as is offered by a valve seal comprising a resilient disk having its outer sealing edge cantilever supported by a center reinforcement plate.

While metal to metal valve contacts have the quality of increased longevity, they generally fail to meet the sealing requirements of many control mechanisms. This is especially the case in low pressure applications involving excessive corrosion. In contrast, cantilever resilient seating offers adequate sealing qualities but fails to be satisfactorily durable and is generally short lived. This is understandable as cantilever supported members especially resilient members tend to experience a relatively large strain or deflection per unit of external load.

Therefore, it is an object of this invention to provide a valve seal having both improved sealing features and increased longevity.

It is also an object of this invention to provide a valve seal having an increased sealing capacity and a decreased sealing strain.

It is another object of this invention to provide a valve seal which is allowed to deflect within the region of contact and which is supported both inwardly and outwardly of that region.

These and other objects, features and advantages of the present invention will be understood in greater detail from the following description of the associated drawings where reference numerals are utilized in designating a preferred embodiment and wherein:

FIGURE 1 shows a cross section of a breather valve having some parts in elevation and illustrating a typical environment of the valve seal meeting the specifications of this invention;

FIGURE 2 is a cross section of a valve seal as illustrated in the working environment of FIGURE 1;

FIGURE 3 is a partially sectioned view showing a portion of the valve seal of FIGURE 2 with the cooperable members in full engagement;

FIGURE 4 shows the valve seal of FIGURE 2 under a condition of zero force between the cooperable members;

FIGURE 5 is a further view of the valve seal shown in FIGURE 2 with the cooperable members in a state of partial separation;

FIGURE 6 shows the cooperable members of the preceding figures fully disengaged;

FIGURE 7 shows an alternate form of the valve seal meeting the specifications of this invention and utilizing a preformed resilient member;

FIGURE 8 is another form of the valve seal of this invention having a clamp ring as a means of additional support; and FIGURE 9 is a further form of the valve seal meeting the specifications as disclosed herein.

The valve system utilized in FIGURE 1, as a typical working environment for the valve seat of this invention, is an End-of-Line Breather used in connection with gasoline or oil storage tanks and the like where vapor pressures tend to build up beyond a safe limit and where vapor pressures occasionally fall below a safe minimum which might in turn produce a collapse of the tank wall. This particular valve assembly involves a single unit for accommodating both increases and decreases in pressure within the connected tanks and comprises generally a pressure section and a vacuum section.

Referring initially to the pressure section, it can be seen that a valve body 1 is connected by a plurality of bolts 2 to pipe or conduit 3 which is in communication with the tank (not shown) for which the present pressure relief system is to operate. The valve body 1 has an interior chamber 4 and is provided with a port 5 defined by an upstanding flange 6 which provides a valve seat.

The valve seal which is the focus of this invention is shown in FIGURE 1 as a disk 7 having a sealing surface 8 in engagement with the valve seat 6. The disk 7 is gravity supported at the seat 6 and is guided axially by a vertical stem 9 slidably received within a guide sleeve 10. The sleeve 10 comprises generally a tubing section having a closed outer end 11 and being supported by an outwardly extending bracket 12 riveted as at 13 to be centrally positioned of the valve cover 14. The cover 14 is removably secured over a series of supporting studs 15 by associated wing nuts 16. Also, it is observed that the breather valve is provided with a flash or bird screen 17 in the form of a screen fitted externally of the studs 15 for encompassing the potential valve opening.

It will be understood that the above-described portion of the breather assembly is used to relieve excessive pressure within the controlled tank. In a preferred use of this valve the pressure at which relief occurs is of the order of 3 or 4 ounces per square inch. Increases in pressure within the throat 2 will lift the valve disk 7 off the cooperating seat 6 for venting the tank to the atmosphere. To compensate for decreasing system pressure below a safe minimum a second valve system is provided to permit atmospheric air to enter the tank through a passageway 18 through the valve body 1 and pipe 3.

This vacuum relief section includes a gravity operated valve plate 19 and a guide stem 20 corresponding to the parts 7 and 9 of the pressure section. However, in this case the plate 19 is disposed to be driven into engagement with a cooperable seat 21 by increases in pressure within the passageway 18. This follows from the fact that the plate 19 has a face 22 directly communicable with the atmosphere through a port 23 formed within the breather housing 1. When the pressure within the controlled tank declines, the atmospheric pressure at the face 22 will lift the disk 19 off the valve seat 21 to substantially equalize internal and external pressures.

Similar to the pressure guide sleeve 10, a vacuum guide sleeve 24 is provided for the valve stem 20 to accomplish substantially axial movement of the valve plate 19 and to assure proper engagement between the cooperable valve contact surfaces. The guide sleeve 24 is formed integrally with a removable cover plate 25 which has an outermost rim 26 cooperable for engaging an annular lip 27 formed externally of the breather housing 1. The cover plate 25 is fastened to the housing 1 by a series of lugs 28 pivoted about a point 29 and received within associated bifurcated prongs 30 extending outwardly of webs 31 formed integrally with the cover 25; wing nuts 16 provide the tightening means for the lugs 28. Finally, as in the case of the pressure relief valve, the port 23 is protected by a flash or bird screen 32 which is positioned by a plurality of bolts 33 received within ports 34 and secured by a series of internally threaded tubing sections 35.

With the above-described breather valve as an environmental background, the details of the valve seal itself can be understood by reference to the enlarged and cross sectioned view of FIGURE 2. Generally, three principal elements, a valve plate, a resilient diaphragm, and a holding plate are combined to form the valve seal of this invention. As shown in FIGURE 2, a resilient diaphragm 40 is sandwiched between a valve plate 41 and a holding plate 42. The resilient diaphragm may be of any suitable material which is impervious to the contents of the tank on which the relief valve is mounted. One material which has been found particularly suitable is a material known as Teflon FEP-fluorocarbon film. The three disks 40, 41 and 42, have center holes 43 aligned axially and positioned over a threaded stud 44 which extends from the lower face of the valve stem 9. The threaded stud 44 has its outer surface extending inwardly of the outer surface of the valve stem 9 to provide an annular flat surface 45 for receiving the valve plate 41. The three disks are then firmly secured by a nut 46 tightened about the stud 44 and against the holding plate 42.

Two principal factors cooperate to provide the focus for this invention. First, the valve plate 41 is provided with an annular groove 48 formed inwardly of its outer edge. Second, the relative diameters of the valve plate 41 and the valve seat 47 are such that the seat 47 is provided to be substantially centrally received by the groove 48. The value of this combination can best be appreciated by reference to FIGURE 3. In FIGURE 3, the valve members are shown in a state of full engagement. It is observed that the pressure exerted on the resilient diaphragm 40 by the weight of the valve plate 41 causes that diaphragm to be deflected inwardly of the groove 48. It is the weight of these members and this associated deflection that in fact provides an effective seal for the system. It should be noted, however, that the provision for the groove 48 not only permits the necessary deflection but also provides a means for supporting the outer most edge of the diaphragm 40 in the form of the depending annular face 49. Due to this outside support the force which would otherwise be experienced inwardly of the contact region as at the point 50 is reduced by one-half. Along with this reduction in force, there is also a concomitant reduction in the amount of deflection sustained by the diaphragm at the point 50. The result of this redistribution of force and deflection is a corresponding increase in longevity for the resilient member.

In addition to this increased longevity, an improved sealing feature is also achieved by the structure of FIGURE 3. In the absence of the outside support mentioned above, deflection accompanying valve contact would tend to raise the outer edge of the resilient member resulting in a single line of contact at the inner edge of valve seat 47. Also, in the absence of such support, the outer edge of the resilient member has a tendency to wrinkle. By providing for outside support, however, this invention contemplates a line of contact at both the inner and outer edge of the seat 47. The result of the provision for the groove 48, therefore, is an improved sealing capacity as well as an increased longevity.

FIGURES 4, 5 and 6 have been arranged to show sequential movements of the cooperating valve members during venting of the controlled system as might be characterized by a lifting of the disk 7 of FIGURE 1 due to excessive pressure within the throat 2. Generally, FIGURE 4 shows the valve head comprising the plate 41 and the diaphragm 40 in a state of zero force with the valve seat 47. At this point the pressure within the controlled environment exceeds atmospheric pressure only by the weight associated with the gravity operated valve head. It should be noted here that the section shown in FIGURE 4 has been taken along lines to show a vent port 53 provided in the upper wall of the valve plate 41 and extending within the hollow region 54 formed by the groove 48 and the diaphragm 40.

FIGURE 5 is a further step toward the complete disengagement of the respective valve members. Here it is particularly emphasized that the outer edge of the resilient diaphragm 40 is free to move from the depending face 49. During normal operation, the outer edge of this diaphragm will be maintained contiguous with the lower surface of the depending face 49 through its own rigidity. However, should the resilient diaphragm adhere to the valve seat 47 the provision for this free outer end aids in the separation of the bonded members. As shown in FIGURE 5, as the plate 41 is lifted from the seat 47, the outer free end of the diaphragm 40 will be deflected at the point 50 such that the angle formed between the surface of the valve seat 47 and the deflected region will gradually increase as at $\alpha$ resulting in a peeling of the diaphragm from the valve seat. It is understood that separation is more easily accomplished by this peeling function than by attempting to separate the respective surfaces with a perpendicular motion such as might be encountered if the outer free end were securely fastened to the depending face 49.

Finally, FIGURE 6 shows that complete separation has been effected, any undesirable bond has been disengaged, and the resilient diaphragm has returned to a position contiguous with the depending face 49.

An alternate form of this invention is shown in FIGURE 7, and the alteration comprises, generally, a design change incorporated into the resilient diaphragm 40. Here, it can be seen that the outer edge of the diaphragm 40 is not contiguous with the depending face 49 but, rather, is preformed to have an upward extending lip 55 received by the groove 48 for being contiguous with the outer surface thereof. The result of this change is to give increased rigidity to the diaphragm in the vicinity of the region of contact. In Examples 3 through 6, it was understood that the outer edge of the diaphragm 40 was free to slide inwardly along the face 49 in response to pressure by the valve seat 47. To depress the diaphragm of FIGURE 7 inwardly of the groove 48, however, an additional force must be exerted by the valve seat 47 for increasing the bend formed at the point 56 between the vertical lip 55 and the horizontal surface 57. It is appreciated, therefore, that the assembly of FIGURE 7 may be utilized where increased contact pressure is needed.

Another embodiment of this invention is shown in FIGURE 8 and may be used where still higher contact pressure is required. In this case, a ring clamp 58 actually fastens the outer extremity of the diaphragm 40 to prevent deflection within the vicinity of the groove 48. To further prevent inward movement of the outer extremity, the valve plate 41 is notched as at 59 and the resilient diaphragm is preformed for being complementarily received therein. With the ring clamp 58 preventing vertical movement and the outermost surfaces 60 and 61 preventing horizontal movement, the diaphragm 40 is substantially constrained from deflecting due to contact pressure.

Still another form for this invention is shown in FIGURE 9 which comprises, generally, a valve plate 62 having a depending flange 63 and a raised surface 64 for forming a hollow region 65 intermediate the plate 62 and the diaphragm 40. Like the assemblies previously discussed, the diaphragm 40 is secured by a holding plate 42 in conjunction with a valve stem as in FIGURE 2. The principal features here are the decrease in material used to develop the hollow region 65 and the provision of the depending flange 63 which not only stiffens the plate 62 but provides an initial supplemental lift to the valve when the valve first begins to open. This supplemental lift occurs due to the radial outward flow of vapor striking the downwardly turned flange 63 and providing a momentary lift due to pressure build up resulting from the eddying of the vapor at this point. The depending flange 63 still further acts as a rip ring which prevents liquid condensation from flowing radially inwardly over the undersurface of the valve. The valve plate 62 of this form may conveniently be a metal stamping.

It will be understood that various modifications might be suggested by the embodiments disclosed, but I desire to claim within the scope of the patent warranted hereon, all such modifications as come within the scope of my invention.

I claim as my invention:

1. In a valve assembly including a valve seat and a valve member cooperable with said seat, the improvement for sealing said valve seat with said valve member comprising an annular valve plate having a flat lower face and actuated by said valve member, a groove formed for complementarily receiving said valve seat, a resilient diaphragm disposed against said lower face of said valve plate and overlying said groove in said face inwardly adjacent the marginal edge of said plate and said diaphragm fixed to said lower face of said plate wholely inward of said groove, and said margins of said diaphragm lying against the lower face of said plate outwardly of said groove, said groove having a width and depth determined as a function of the resiliency of said diaphragm such that said diaphragm is maintained in spaced relation with the base of said groove during engagement with said valve seat, whereby said resilient diaphragm provides the principal support for said valve member during engagement with said valve seat.

2. In a valve assembly including a valve seat and a valve member cooperable with said seat, the improvement for sealing said valve seat with said valve member comprising an annular valve plate having a flat lower face and actuated by said valve member and having a recess in said face inwardly adjacent the marginal edge of said plate and formed for complementarily receiving said valve seat, a resilient diaphragm having a portion thereof disposed in the vicinity of said recess for being supported by said valve plate, said resilient diaphragm fixedly secured to the lower face of said valve plate inwardly of said groove and extending to the marginal edge of said plate and movably positioned on said lower face of said plate outwardly of said groove, said resilient diaphragm forming a substantially enclosed hollow region in conjunction with said valve plate at said recess, whereby said resilient diaphragm is provided to engage said valve seat at said hollow region.

3. In a valve assembly including a valve seat and a valve member cooperable with said seat, the improvement for sealing said valve seat with said valve member comprising an annular valve plate having a flat lower face actuated by said valve member and having an annular groove formed for complementarily receiving said valve seat, a resilient diaphragm disposed against the face of said valve plate and overlying said groove, said groove being defined by an inner and an outer rim thereof, said resilient diaphragm contacting said valve plate inwardly of said groove and having its outermost margin preformed at right angles to extend inwardly to seat in said groove at the outer rim of said groove, whereby said resilient diaphragm is supported in spaced relation with the base of said groove.

4. The device according to claim 1 wherein the marginal edge of said plate is provided with a downwardly depending lip whereby said depending lip provides an environmental shield for said resilient diaphragm during engagement of said valve seat.

5. The device according to claim 1 whereby the outer marginal edge of said valve member is turned downward past said web, whereby said fluid passing through the port as said valve member opens strikes said marginal edge and provides a supplemental lift action to said valve member.

6. A pressure relief valve for tanks containing highly volatile fluids to relieve the vapor pressure therein when it rises above a predetermined point comprising an annular valve body having a chamber in open communication with the interior of a tank and also having a port defined by an upwardly facing valve seat, said body having a flat lower face of said valve member having an annular groove therein opposite said valve seat and larger than said valve seat, a web of resilient material secured to the major portion of said face, said web extending across said groove and extending to the marginal edge of said lower face member and supported only in unclamped position against the surface outwardly of said groove, whereby the mating of said valve member and said valve seat occurs by flexible seating of said web on said valve seat and whereby said valve opens when said vapor pressure within said valve chamber rises above said predetermined point, said valve member being formed of a metal stamping having a downwardly turned marginal edge, whereby vapor escaping through said port and passing readily outward over the undersurface of said valve member strikes said marginal edge and augments the lifting action acting to raise said valve member.

7. A pressure relief valve for tanks containing highly volatile fluids to relieve the vapor pressure therein when it rises above a predetermined point comprising an annular valve body having a chamber in open communication with the interior of a tank, a port defined by an upwardly facing annular valve seat, said valve body having a flat lower face of said valve body having an annular groove therein opposite said valve seat and of larger diameter than said valve seat, a web of resilient material secured to the major portion of said lower face interiorly of said groove, said web extending across said groove to the marginal edge of said lower face and said margins of said web lying against the lower face of said plate outwardly of said groove in unclamped position thereagainst outwardly of said groove, whereby the mating of said valve member and said valve seat occurs by the flexible seating of said web on said valve seat and whereby said valve opens when the vapor pressure within said valve chamber rises above said predetermined point.

References Cited

UNITED STATES PATENTS

| 1,934,314 | 11/1933 | Lawler | 251—357 X |
| 2,670,759 | 2/1954 | St. Clair | 137—540 |
| 3,224,646 | 12/1965 | Bruns | 137—533.31 X |

FOREIGN PATENTS

| 182,761 | 2/1936 | Switzerland. |
| 680,031 | 8/1931 | Germany. |
| 956,005 | 1/1957 | Germany. |

WILLIAM F. O'DEA, *Primary Examiner.*

DENNIS H. LAMBERT, *Assistant Examiner.*